April 19, 1955 — L. R. KRASNO — 2,706,755
AUTOMATIC FLUID LEVEL INDICATOR
Filed Feb. 18, 1952 — 3 Sheets-Sheet 1

INVENTOR
LOUIS R. KRASNO
BY *Young & Wright*
ATTORNEYS

April 19, 1955

L. R. KRASNO 2,706,755

AUTOMATIC FLUID LEVEL INDICATOR

Filed Feb. 18, 1952

INVENTOR
LOUIS R. KRASNO

BY *Young and Wright*

ATTORNEYS

April 19, 1955 L. R. KRASNO 2,706,755
AUTOMATIC FLUID LEVEL INDICATOR
Filed Feb. 18, 1952 3 Sheets-Sheet 3

INVENTOR
LOUIS R. KRASNO

BY
*Young Wright*
ATTORNEYS

United States Patent Office 2,706,755
Patented Apr. 19, 1955

2,706,755

AUTOMATIC FLUID LEVEL INDICATOR

Louis R. Krasno, Bethesda, Md.

Application February 18, 1952, Serial No. 272,189

7 Claims. (Cl. 200—85)

This invention appertains to hospital equipment and more particularly to a novel device for facilitating intravenous feeding, blood transfusions and the like.

One of the primary objects of my invention is to provide a device, which will automatically indicate, when a transfusion or an intravenous feeding is about to be completed, so that the desired attention can be quickly given to the patient.

Another salient object of my invention is the provision of means for automatically closing a circuit through an electric light bulb when the fluid in a bottle reaches a predetermined low level, whereby a nurse can instantly be warned by a mere glance from a point distant, that her services are needed.

A further object of my invention is the provision of an automatic signal for blood transfusions and intravenous feedings which will have many advantages in a hospital, such as: 1. Eliminating the necessity of a nurse leaving her station to make numerous checks on the level of intravenous fluids. This conserves time and energy of the nursing staff. 2. The elimination of the necessity of entering a patient's room during the night to make checks on the fluid level. 3. Eliminating the possibility of the emptying of a bottle when a second bottle is to follow. Where a second bottle of fluid is needed and a first bottle has been entirely emptied, it becomes necessary to again stick the patient with a needle as well as using a second intravenous set-up, i. e., tubing, needle etc. 4. In large wards where one or more patients are receiving intravenous fluids, a nurse is able to check at a glance throughout the entire ward, whether any intravenous feeding is about to be completed. This can be done without leaving her station in the ward.

A still further object of my invention is to provide an automatic signal of the above character, which can effectively be interposed between the bottle containing the fluid for an intravenous feeding or the like and the supporting stand for the bottle.

With these and other objects in view, the invention consists in the novel construction, arrangement and formation of parts as will be hereinafter more specifically described and claimed and illustrated in the accompanying drawings, in which drawings, Figure 1 is a perspective view of my improved signal or indicator showing the same in use.

Figure 1:
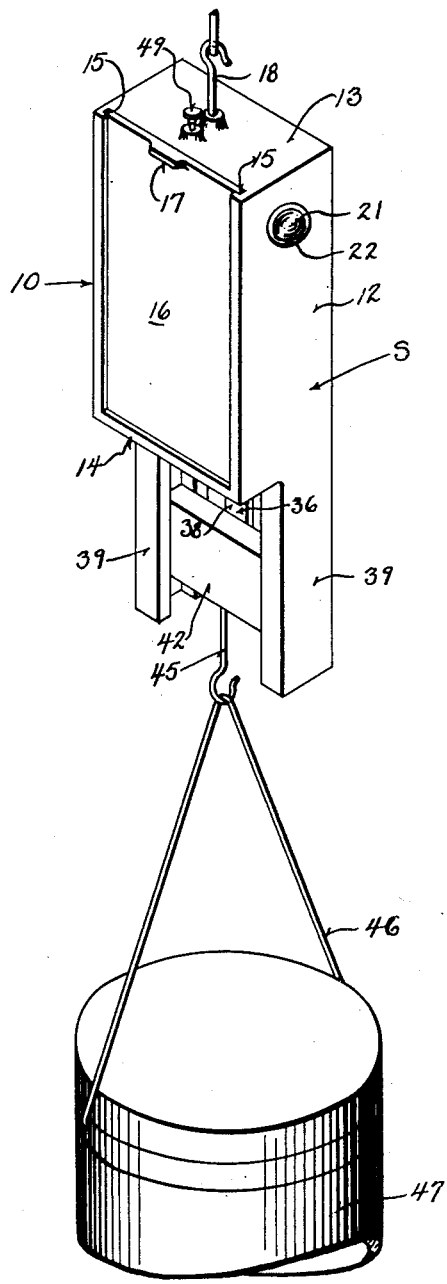
Figure 2:
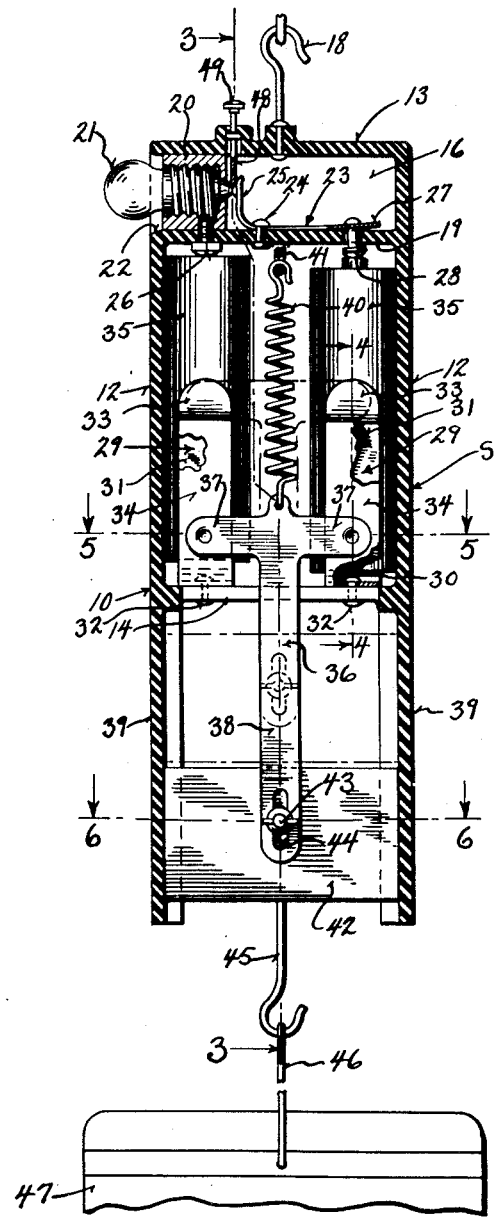
Figure 2 is a vertical sectional view through the indicator taken on the line 2—2 of Figure 3, looking in the direction of the arrows, the view also showing the device in use.
Figure 3:
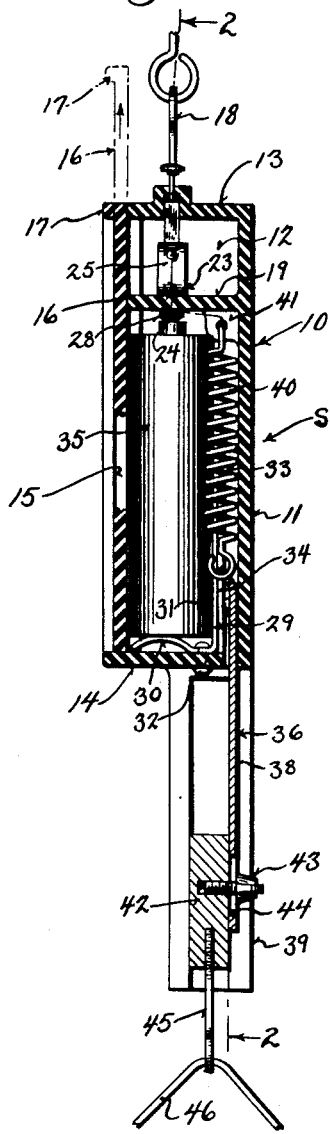
Figure 3 is a vertical sectional view taken at right angles to Figure 2, and on the line 3—3 of Figure 2.
Figure 4:
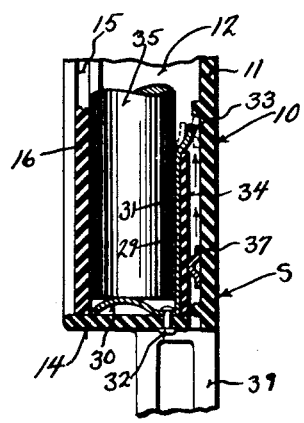
Figure 4 is a fragmentary longitudinal sectional view taken on the line 4—4 of Figure 2, looking in the direction of the arrows and illustrating more particularly the circuit closer.
Figure 5:
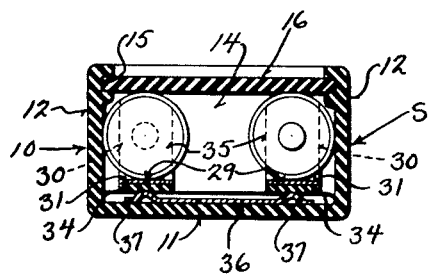
Figure 5 is a transverse sectional view taken on the line 5—5 of Figure 2, looking in the direction of the arrows.
Figure 6:
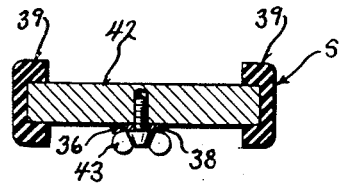
Figure 6 is a transverse sectional view taken on the line 6—6 of Figure 2, looking in the direction of the arrows.

Referring to the drawings in detail, wherein Figures 1 to 6, inclusive, illustrate one embodiment of my invention, the letter S generally indicates the improved signal or indicator for blood transfusion or intravenous feedings, as the case may be. This signal or indicator S includes a housing or case 10, preferably formed from plastic. This case, obviously, can take different forms, but as shown the same includes a rear wall 11, side walls 12, and top and bottom walls 13 and 14. The side walls 12 are provided with guide grooves 15 for slidably receiving a front cover wall 16. This sliding front wall 16 facilitates the replacement of parts, the insertion of batteries and the like, as will later appear. A suitable finger piece 17 is formed on the front cover 16 to facilitate the sliding thereof. Anchored to the top wall 13 is a hook 18, whereby the device can be suspended from a suitable stand. A horizontally disposed partition 19 can be formed within the case 11, as is clearly shown in Figures 2 and 3.

Disposed within the housing or case 10 above the partition 19 is a socket 20 for an electric light bulb 21. One side wall 12 is provided with an opening 22, whereby the bulb can be easily threaded into the socket, and whereby the bulb can be seen from the outside of the case. Supported by the partition 19 is a resilient conductor strip 23. This strip is riveted intermediate its ends, as at 24, to the partition and the strip includes a resilient finger 25 which is adapted to engage the central contact of the bulb. The partition also supports a contact 26 which electrically engages the shell of the bulb and it is to be noted that this contact 26 extends below the partition for a purpose, which will also appear. Referring back to the conductor strip 23, it is to be also noted that the same includes a resilient arm 27, and the outer end of this arm carries a resilient contact button 28, which extends downwardly and loosely through the partition 19 for a purpose which will also appear.

Secured in spaced relation within the case is a pair of L-shaped conductor plates 29. The shape of the plates defines a bottom resilient foot 30 and an upstanding arm 31. These L-shaped plates 29 can be riveted, as at 32, to the bottom wall 14 of the case 10, in such a manner that the arms 31 are arranged in spaced relation to the rear wall 11. The extreme upper ends of the arms 31 are bent inwardly toward the rear wall, as at 33, and form contact points. Strips of insulation 34 cover the inner surface of the arms 31 below the contact points 33, which are exposed. Batteries 35 of the flash light type are inserted within the case and the lower ends of the batteries electrically engage the resilient feet 30 of the conductor plates 29. The central contact of one battery engages the contact button 28 and the normal lower end of the other battery (said battery being inverted) engages the contact screw 26.

Slidably mounted within the case is a T-shaped conductor bridge strip 36. The oppositely extending arms 37 of the conductor bridge strip lie between the rear wall 11 of the case and the batteries 35 and are adapted to engage at a certain time the contact points 33 for bridging the same. The depending leg 38 of the T-shaped conductor strip extends below the case and between a pair of depending guides 39 which can be molded on the case. A contractile coil spring 40 of a desired tension is connected to the T-shaped conductor bridge plate 36 and to an eye 41 carried by the upper end of the case and functions to normally pull up on the bridge plate to bring the arms 37 thereof into electrical engagement with the contacts 33. To facilitate the sliding movement of the bridge plate 36, a carriage 42 is slidably mounted in the guide tracks 39 and the arm 38 of the bridge plate is connected to the carriage by means of a thumb screw 43. The arm 38 is slotted, as at 44, to receive the shank of the thumb screw and hence the carriage 42 and the bridge plate can be adjusted relative to one another. Rigidly secured to the lower end of the carriage 42 is a depending hook 45 for receiving the bail 46 of a bottle 47 containing intravenous feeding fluid, or the like.

From the above, it can be seen that the signal S is of a compact order and is so-designed as to be readily interposed between a supporting stand and a bottle containing a fluid. The tension of the spring 40 is such that when the bottle 47 is filled with a fluid, the bridge plate 38 and the carriage 42 will be in a lowered position with the arms 37 of the bridge plate out of electrical contact with the points 33. As the fluid flows out of the bottle, the bridge plate 36 and the carriage 42 will be gradually pulled up by the spring 40 and when the fluid in the bottle reaches a predetermined low level the spring 40 will have pulled the bridge plate 36 up to a point where the arms 37 will electrically contact the points 33 and close an electric circuit through the bulb 21. This will give the desired signal to an attendant or nurse.

In order to avoid the running down of the batteries 35 when the signal is not in use, I can provide a manually operable switch for opening the circuit. This can take the form of a slide plate 48 formed from insulation carried by the top wall 13 of the case. Connected with the slide plate is an operating finger piece 49 and by pushing down on the finger piece the slide plate 48 can be forced between the resilient portion 25 of the conductor strip 23 and the central contact of the light bulb 21.

Figure 7:
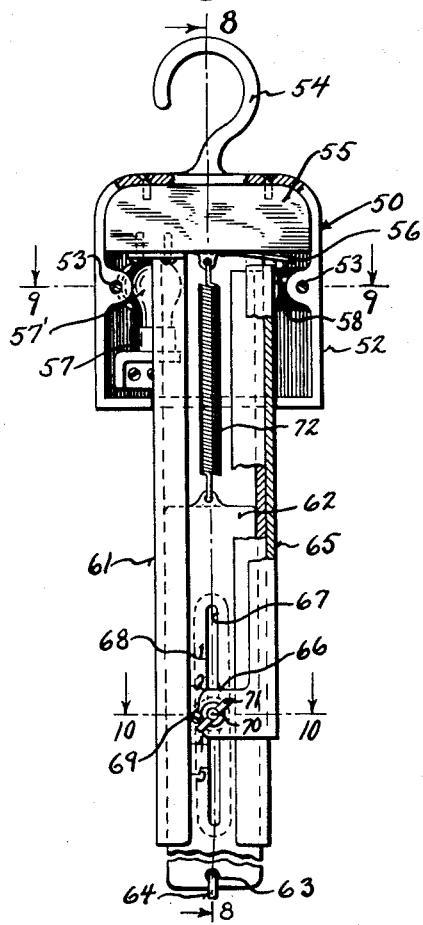
Figure 7 is a vertical longitudinal sectional view through a form of my indicator utilizing house current for the signal, the section being taken on the line 7—7 of Figure 8, looking in the direction of the arrows.
Figure 8:
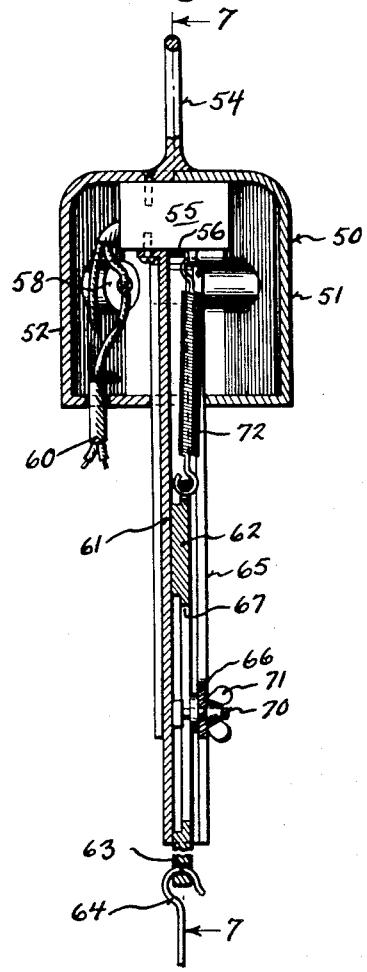
Figure 8 is a longitudinal sectional view taken at right angles to Figure 7 and on the line 8—8 of Figure 7, looking in the direction of the arrows.
Figure 9:
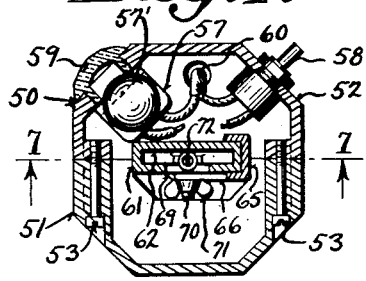
Figure 9 is a horizontal sectional view taken on the line 9—9 of Figure 7, looking in the direction of the arrows.
Figure 10:
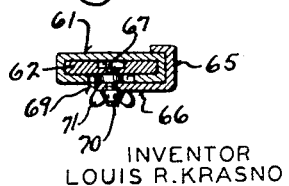
Figure 10 is a horizontal sectional view taken on the line 10—10 of Figure 7 looking in the direction of the arrows and illustrating the guide for the slide and the adjustable connection between the slide and the switch actuating member.

In many instances, it would be preferable for my indicator to operate from house current, in lieu of batteries, and in Figures 7 to 10, inclusive, I have shown one form of my invention operated off of house current. As illustrated, this indicator includes an upper casing 50, preferably, but not necessarily formed from plastic material molded into the desired shape. The casing includes companion halves 51 and 52 detachably connected together by fastening elements, such as screws 53. One section of the casing can have formed thereon or secured thereto, a hook 54 or the like, for connection with a supporting stand (not shown). Rigidly secured in the casing is a microswitch 55 having its switch lever 56 disposed lowermost for a purpose, which will later appear. Also secured in the casing is a light socket 57 and a manually operated switch 58. The light socket 57 detachably receives an electric light bulb 57'. The casing carries a window or colored jewel 59 and the light bulb 57' is arranged directly in rear of this window so light emanating from the bulb will shine through the window. Feed and return electric wires 60 extend into the casing from any suitable source of electric current, and the microswitch 55, the electric light socket 57 and the manually operated switch 58 are electrically connected to the feed and return wires in accordance with electric practice, so that when the switch 58 is manually operated to close the circuit, and when the switch lever 56 of the microswitch 55 is actuated toward the housing of the switch, a circuit will be closed through the electric light bulb 57'.

Rigidly secured to the casing 50 and to the housing 55 of the microswitch is a depending guide 61 and slidably mounted in the guide for movement toward and away from the microswitch 55 is a carriage or slide plate 62. The lower end of the slide plate 62 is provided with an eye 63 for receiving a hook or the like 64 for supporting a bottle of intravenous liquid or other desired fluid. Also slidably mounted on the guide 61 is a switch actuating slide piece 65. This switch actuating slide piece 65 is preferably of a U-shape in cross section for embracing the guide 61, and a portion of the slide piece has formed thereon a laterally extending arm 66 which extends over the slide plate 62. The slide plate 62 has formed therein a longitudinally extending slot 67 and a numbered scale 68 is marked on the slide plate adjacent to one edge of the slot 67. Cooperating with the scale 68 is a pointer 69 formed on the arm 66. The switch actuating piece 65 is adjustably connected to the slide plate 62 in any desired way, such as through the use of a headed bolt 70 which extends through the slot 67 and through the arm 66. A winged nut 71 is threaded on the bolt so that the parts 65 and 62 can be rigidly connected together in a desired adjusted position according to the character and weight of the fluid in the container (not shown).

A contractile coil spring 72 is connected to the upper end of the slide plate 62 and to the casing 50 or the housing 55 of the microswitch, as shown. The spring 72 functions to normally raise the slide 62 so that the upper end of the switch actuating slide piece 65 will contact the microswitch to close the circuit through the bulb 57' when the weight of the fluid in a bottle decreases to a certain predetermined amount.

In practice, the indicator 50 is connected to a supporting stand and the bottle of liquid is connected to the slide plate 62 which will move down the slide plate 62 and the slide piece 65 against the tension of the spring 72. The slide piece 65 and the slide plate 62 are adjusted according to the desired needs and when the weight of the bottle and the liquid decreases, the spring 72 will pull up on the carriage or slide plate 62 and the slide piece 65 to actuate the switch 55 and close the circuit through the bulb 57', which will indicate to the person in charge that the bottle containing the fluid should be replenished. When the device is not in use the same can be left on the stand, if such is preferred and the switch 58 is manually actuated to open the circuit through the bulb 57'.

Changes in details may be made without departing from the spirit or the scope of this invention, but what I claim as new is:

1. An automatic intravenous and like liquid level indicator unit comprising a freely portable case, a plate slidably carried by the case, means carried by the upper end of the case for detachable connection with a support, means carried by the plate for connection with a bottle containing liquid, spring means normally tending to raise the plate, and means actuated by the plate for closing a circuit when the plate is in an extreme raised position.

2. An automatic intravenous and like liquid level indicator unit comprising a freely portable case, means on the upper end of the case for detachable connection with a support, a slide movably carried by the case, means for connecting the lower end of the slide to a container for liquid, spring means normally holding the slide in a raised position, a switch in the case for opening and closing a circuit, and means for actuating the switch from the slide, when the slide is in an extreme raised position.

3. An automatic intravenous and like fluid level indicator unit comprising a freely portable case adapted to be interposed between a container for intravenous fluid and a supporting stand therefor, means on the upper end of the case for detachable connection with a support and a circuit closer for opening and closing a circuit including a pair of spaced contact strips mounted in said case, a sliding bridge plate for the strips, means normally tending to raise the bridge plate into electrical contact with the strips, and means carried by the bridge plate for supporting a bottle containing fluid, the weight of the fluid in the bottle holding the bridge plate out of electrical contact with the strips.

4. In an automatic intravenous and like fluid level indicator adapted to be interposed between a bottle containing a fluid and a stand therefor, a case, means carried by the upper end of the case for connection with the stand, weight responsive switch means carried by the case including a pair of spaced upright contact strips, a T-shaped bridge plate slidable in the case adapted to engage and bridge the contact strips when in a raised position, spring means normally tending to raise the bridge plate to its contacting position, guide tracks carried by the case, a carriage in said tracks, means connecting the carriage to the plate, and a hook on said carriage for supporting a bottle containing a fluid.

5. In an automatic intravenous and the like fluid level indicator as defined in claim 4, and means for adjusting the carriage and the bridge plate relative to one another.

6. In an automatic intravenous and the like fluid level indicator as defined in claim 4, and said means for raising the bridge plate including a contractile coil spring of a tension to hold the bridge plate, carriage and a partially empty bottle in a raised position.

7. In an automatic intravenous and like liquid level indicator, a casing, a depending guide carried by the casing, a plate slidably mounted in the guide, a microswitch in said casing, means on the upper end of the casing for connection with a support, means on the lower end of the slide for connection with a bottle containing a liquid, a slide piece on the guide, means adjustably connecting the slide piece to the slide plate, spring means normally tending to raise the slide plate and the slide piece, and said microswitch having an actuating member disposed in the path of the slide piece.

References Cited in the file of this patent

UNITED STATES PATENTS

| | | |
|---|---|---|
| 335,223 | Hexamer | Feb. 2, 1886 |
| 733,421 | Rapp | July 14, 1903 |
| 1,449,153 | Spurrier | Mar. 20, 1923 |
| 2,326,208 | Edwards | Aug. 10, 1943 |